United States Patent
Ingwersen et al.

(10) Patent No.: US 11,400,541 B2
(45) Date of Patent: Aug. 2, 2022

(54) METHOD FOR PRODUCTION OF A COMPONENT BY ATOMIC DIFFUSION BONDING

(71) Applicant: Berliner Glas KGaA Herbert Kubatz GmbH & Co., Berlin (DE)

(72) Inventors: Jan Ingwersen, Berlin (DE); David Kieven, Berlin (DE)

(73) Assignee: ASML NETHERLANDS B.V., Veldhoven (NL)

(*) Notice: Subject to any disclaimer, the term of this patent is extended or adjusted under 35 U.S.C. 154(b) by 0 days.

(21) Appl. No.: 17/170,729

(22) Filed: Feb. 8, 2021

(65) Prior Publication Data
US 2021/0260688 A1    Aug. 26, 2021

(30) Foreign Application Priority Data
Feb. 25, 2020    (DE) .......................... 102020104907.2

(51) Int. Cl.
*B23K 20/00* (2006.01)
*B23K 20/02* (2006.01)
(Continued)

(52) U.S. Cl.
CPC .......... *B23K 20/026* (2013.01); *B23K 20/002* (2013.01); *B23K 20/24* (2013.01);
(Continued)

(58) Field of Classification Search
CPC ............ B23K 2103/50; B23K 26/0622; B23K 26/0624; B23K 26/0736; B23K 26/351; B23K 26/361; B23K 26/40
See application file for complete search history.

(56) References Cited

U.S. PATENT DOCUMENTS 4,217,570 A  *  8/1980  Holmes ................ H01C 17/265
                                                             338/195
4,487,644 A     12/1984  Gupta et al.
(Continued)

FOREIGN PATENT DOCUMENTS

DE           3003186 A1     8/1981
DE     102019205235 A1    10/2019
(Continued)

OTHER PUBLICATIONS

Akatsu et al. (1997). Microstructure and strength of Al-sapphire interface by means of the surface activated bonding method. Journal of materials research, 12(3): 852-856.
(Continued)

*Primary Examiner* — Erin B Saad
(74) *Attorney, Agent, or Firm* — Caesar Rivise, PC

(57) ABSTRACT

A method for producing a component from two plates, which are electrically isolating, at least one is optically transparent, and between them at least one planar conductor section and at least one isolator section are formed, comprises bonding the plates at mutually facing bonding faces, wherein a metal layer is arranged therebetween, and processing the metal layer by local heating using laser radiation such that the metal layer is converted into the at least one isolator section in a part region, and the at least one conductor section is formed adjacent thereto. To form the at least one isolator section, the light path of the laser radiation and the component are moved relative to each other to convert the metal layer into the at least one isolator section over a line or area. Bonding faces of metallic bond layers are polished. The plates are bonded by atomic diffusion bonding.

14 Claims, 3 Drawing Sheets

(51) Int. Cl.
*B23K 20/24* (2006.01)
*B23K 103/00* (2006.01)

(52) U.S. Cl.
CPC ...... *B23K 2103/42* (2018.08); *B23K 2103/52* (2018.08); *B23K 2103/54* (2018.08)

(56) References Cited

U.S. PATENT DOCUMENTS

| | | | |
|---|---|---|---|
| 4,924,064 A * | 5/1990 | Stormbom | H01G 4/255 219/121.85 |
| 6,864,957 B2 | 3/2005 | Van Elp et al. | |
| 7,092,231 B2 | 8/2006 | Hoeks et al. | |
| 8,087,567 B2 | 1/2012 | Meschke et al. | |
| 8,486,443 B2 * | 7/2013 | Schuhmacher | A61K 31/567 424/448 |
| 8,668,925 B2 * | 3/2014 | Langguth | A61K 9/70 424/443 |
| 8,962,013 B2 * | 2/2015 | Langguth | A61K 9/7053 424/443 |
| 2002/0023901 A1 * | 2/2002 | Smart | B23K 26/0624 257/E23.15 |
| 2011/0288648 A1 | 11/2011 | Joseph et al. | |
| 2012/0236458 A1 | 9/2012 | Ingwersen | |
| 2018/0248087 A1 | 8/2018 | Ichikawa | |
| 2019/0315646 A1 | 10/2019 | Tanno | |
| 2020/0234992 A1 | 7/2020 | Hoescheler et al. | |
| 2020/0369000 A1 | 11/2020 | Sato et al. | |

FOREIGN PATENT DOCUMENTS

| | | |
|---|---|---|
| DE | 102019101657 A1 | 7/2020 |
| EP | 0093199 A2 | 11/1983 |
| EP | 0076467 B1 | 12/1986 |
| EP | 1637271 B1 | 5/2011 |
| EP | 3196926 A1 | 7/2017 |

OTHER PUBLICATIONS

Akselsen (1992). Diffusion bonding of ceramics. Journal of materials science, 27(3): 569-579.
Canon Anelva Corporation (2019). BC7000, Atomic Diffusion Bonding Equipment: 1-5.
English Abstract for DE 3003186 A1 (1981).
Dong et al. (2011). Joining of SiC ceramic-based materials with ternary carbide Ti3SiC2. Materials Science and Engineering B, 176: 60-64.
Halbig et al. (2006). Diffusion Bonding of Silicon Carbide Ceramics Using Titanium Interlayers. NASA: 1-21.
Higurashi et al. (2017). Room-temperature bonding of wafers with smooth Au thin films in ambient air using a surface-activated bonding method. IEICE Transactions on Electronics, 100(2): 156-160.
Shimatsu (2019). Atomic Diffusion Bonding Room Temperature Bonding of Wafers for Creating the Future of Electronic and Optical Devices Tohoku University: 3D & Systems Summit: 1-25.
Suga et al. (1992). Structure of Al-Al and Al—Si3N4 interfaces bonded at room temperature by means of the surface activation method. Acta metallurgica et materialia, 40: S133-S137.
Suga (2012). Low temperature bonding for 3D integration—A review of the surface activated bonding (SAB). 3rd IEEE International Workshop on Low Temperature Bonding for 3D Integration: 7-10.
Suga (2014). Low Temperature Bonding for 3D Integration—Surface Activated Bonding (SAB). Hyomen Kagaku, 35 (5): 262-266.
Suga (2017). Introduction to the innovative interface bonding technology. IEEE 5th International Workshop on Low Temperature Bonding for 3D Integration (LTB-3D): 1.
Wang et al. (1990). Solid State Bonding of Si3N4 and Ni. Mat. Res. Soc. Symp., 170: 99-104.

* cited by examiner

US 11,400,541 B2

METHOD FOR PRODUCTION OF A COMPONENT BY ATOMIC DIFFUSION BONDING

BACKGROUND OF THE INVENTION

The invention concerns a method for production of a component from two plates, wherein both plates are electrically isolating, at least one of the plates is optically transparent, and at least one planar conductor section and at least one isolator section are formed between the plates; in particular, it concerns a method for processing a component with a sandwich structure in which a metal layer is embedded, e.g. a method for processing a component composed by bonding, wherein the component has a metallic intermediate layer.

Applications of the invention lie in the production of tools for holding or moving workpieces, such as e.g. semiconductor wafers or glass wafers, under the effect of electrical fields, or in the production of conductor components, in particular resistance heating elements.

In the present description, reference is made to the following prior art which constitutes the technical background to the invention:
[1] U.S. Pat. No. 7,092,231 B1;
[2] U.S. Pat. No. 6,864,957 B2
[3] US 2012/0236458 A1;
[4] EP 1 637 271 B1;
[5] US 2011/0288648 A1;
[6] O. M. Akselsen in "J. of Material Science" 27 (1992), 569-579;
[7] Dong et al. in "Materials Science and Engineering" B 176, 60-64 (2011)
[8] Michael C. Halbig et al. "Diffusion Bonding of Silicon Carbide Ceramics Using Titanium Interlayer" NASA, 22.01.2006, http://ntrs.nasa.gov/archive/nasa/casi.ntrs.nasa.gov/20060051742.pdf;
[9] EP 0 093 199 A2;
[10] EP 0 076 467 B1;
[11] DE 3 003 186 C1;
[12] DE 10 2019 101 657.6 (unpublished at the date of priority of the present invention);
[13] EP 3 196 926 A1;
[14] E. Higurashi et al. in "IEICE TRANS. ELECTRON.", Bd. E100-C, No. 2, February 2017, "Room-Temperature Bonding of Wafers with Smooth Au Thin Films in Ambient Air Using a Surface-Activated Bonding Method";
[15] T. Suga et al. in "MRS Advanced Materials, Materials Research Society", 8, 257 (1989); and
[16] T. Suga et al. in "Acta Metall. Mater.", 40, 133 (1992).

Tools for handling workpieces under the effect of electrical fields, in particular electrostatic holding devices for holding wafers (so-called electrostatic clamps, electrostatic chucks) are generally known (see e.g. [1], [2]). An electrostatic holding device comprises e. g. a plane component with two electrodes which are formed by thin metallic layers. When the electrodes are loaded with a high voltage, an electrical field is produced in the environment, the effect of which attracts a wafer onto the holding device. The wafer can be moved by means of the holding device, e.g. between different workstations in a coating plant, for as long as the high voltage is applied.

In a conventional electrostatic holding device, the electrodes are formed by the deposition of a metal layer on the surface of a carrier, subsequent structuring of the metal layer, and covering of the structured metal layer with an isolating cover layer. The cover layer serves as a dielectric and to protect the electrodes. This method is disadvantageous because of its complexity, in particular when carriers made of electrochemically bonded glass plates are used.

In addition, thin metal layers have numerous further applications e.g. as electrodes, conductors or resistance elements. In order to protect the metal layers on a substrate surface of a component from environmental influences, a cover layer may be provided on the metal layer also in the other applications. The cover layer however has disadvantages for production of the component, since deposition of the cover layer constitutes an additional process cost and can only be carried out after processing of the metal layer, e.g. structuring by ablation or etching, for its adaptation to the respective application.

Furthermore, the metal layer may be unintentionally changed during deposition of the cover layer.

There is therefore interest in a modified method in which, in a first step, a metal layer is embedded between a substrate and a cover layer, or generally between two plates, and then the metal layer is processed. For example, [3] describes the production of an electrostatic holding device with such a method. Glass plates are joined by anodic bonding using a metallic bond layer. Then the metallic bond layer is structured by a locally restricted laser processing so as to form at least two electrodes. The laser processing locally converts the metallic bond layer into an isolation layer which separates the electrodes from each other.

The technique described in [3] however has the disadvantage that, because of the use of the anodic bonding, only a limited number of suitable plate materials is available. Only glasses in which the electrical resistance diminishes greatly during the period of higher temperature in anodic bonding, and with thermal expansion coefficients suitable for the joint partners (process temperature around 250° C.), may be used. Furthermore, these glasses must contain specific ions (e.g. earth alkali ions) so that during anodic bonding, by application of a voltage, a volume charge zone or depletion zone occurs at the bond interface. Glasses are however relatively soft in comparison with other materials, e.g. sapphire, diamond or ceramic. An electrostatic holding device produced according to [3] may therefore have limited resistance to abrasion from the held wafer and limited precision in holding the wafers. Furthermore, the dielectric properties of the glasses suitable for anodic bonding are only limitedly suitable for use in the electrostatic holding device.

The restriction to specific glasses is avoided with diffusion bonding, in which in contrast to anodic bonding, plane plates are bonded together in a uniaxial hot press under the effect of pressure and heat. For example, ceramic plates may be joined (see [4] to [11]). Diffusion bonding takes place in the hot press, e.g. at temperatures above 1600° C. and pressures above 100 bar (see [4]). In diffusion bonding, metallic layers may be used as bond layers.

The use of diffusion bonding for joining plates of an electrostatic holding device is described in [12]. With this method, the metallic bond layers may be used as electrodes. The structuring of the electrodes however must take place before bonding, in contrast to the method according to [3]. Furthermore, there are disadvantages because of a limited accuracy in setting the electrode form and because of the high process temperature. Since diffusion bonding takes place at a very much higher temperature than the use of the electrostatic holding device, only identical materials or materials with the same thermal or similar expansion coefficients may be joined.

[13] describes the production of an electrostatic holding device, in which platform-like parts are joined by atomic diffusion bonding (ADB) at room temperature. Atomic diffusion bonding, in contrast to diffusion bonding, does not require increased temperatures or pressures. The use of atomic diffusion bonding in [13], in the plate composition of the holding device, is however restricted to an interface at which coolant channels are formed and which is therefore divided into a plurality of bonding sections each of relatively small extent. With this method, the electrodes are formed by additional metallic layers in the plate composition.

The objective of the invention is to provide an improved method for production of a component by joining two plates and structuring of a metal layer embedded between the plates, with which disadvantages of conventional techniques are avoided. In particular, the invention is intended to facilitate the production of the component, to allow the structuring of the metal layer embedded between the plates, overcome restrictions with respect to the plate materials—in particular, to allow the use of materials with different thermal and/or electrical properties—and/or allow joining over larger bonding faces.

This objective is achieved by a method of the invention.

BRIEF SUMMARY OF THE INVENTION

According to a general aspect of the invention, said objective is achieved by a method for producing a component from two plates, wherein both plates are electrically isolating, and at least one of the plates is optically transparent. Between the plates, at least one planar conductor section (also designated as electrode section or resistance section) and at least one isolator section are formed by the following steps.

The plates are each provided with at least one plane surface which carries a bond layer. The plate surface with the bond layer is called the bonding face. The plates are joined along their bonding faces by bonding. The bonding forms a continuous, uninterrupted joint connection between the two plates, which preferably extends over the entire plate surface and is designated as a bond. As a result of bonding, a metal layer is arranged between the plates. The metal layer is embedded between the plates.

The term "metal layer" means a layer of at least one electrically conductive substance which consists of or contains a metal. The metal layer preferably has a thickness which is equal to or less than 1 µm, particularly preferably equal to or less than 0.1 µm, in particular equal to or less than 50 nm, e.g. 30 nm or smaller. In order to guarantee the function of the metal layer in the carrier, e.g. as an electrode or heating resistor, the metal layer preferably has a thickness which is at least 20 nm, preferably at least 50 nm, in particular at least 0.1 µm, e.g. 1 µm, but may also be larger. The metal layer is embedded in the component, i.e. arranged in the component such that the metal layer is delimited by the plates on both sides along its superficial extent.

The bonded plates extend in a plane which is here called the main plane. The direction parallel to the main plane is also called the lateral direction, and the direction perpendicular thereto is the thickness direction. The plates may also be designated as wafers, layers, leaves or lamellae. They may each be formed integrally from a single material or be made from several materials. The plates preferably have the same shape and size in the lateral direction. On sides facing away from each other, the plates may also have plane surfaces or alternatively structured surfaces. Structured surfaces comprise e.g. burls protruding in the thickness direction, the end faces of which span a plane burl contact plane in the lateral direction, or depressions for forming tempering agent lines, e.g. cooling channels.

After bonding, the metal layer is processed by locally limited heating of the metal layer by means of laser radiation. The laser radiation causes the metal layer to be converted into at least one isolator section in a part region, and the at least one conductor section is formed adjacent to the at least one isolator section. The at least one isolator section is a region in which the material of the plates and the bond is electrically isolating. The at least one conductor section is a region in which the metal layer is retained. Preferably, the at least one conductor section is not irradiated during processing of the metal layer. In the at least one conductor section, the material of the bond is electrically conductive. The plates consist of at least one material which is not sensitive to a local temperature rise for converting the metal layer into the at least one isolator section.

The conversion of the metal layer into the isolator section is restricted to each irradiation site, so that the surrounding materials of the plates and the adjacent metal layer remain unaffected. Undesirable changes to the carrier, such as e.g. thermally induced distortion, may be avoided. Furthermore, the locally acting laser radiation allows processing of the metal layer with a high spatial resolution. This is advantageous in particular for structuring of electrodes. Finally, the laser radiation offers the possibility of easily setting or changing at least one irradiation site on the metal layer. Thus, to form an extensive isolator section, the light path of the laser radiation and the carrier with the metal layer are moved relative to each other (scanning) in order to convert the metal layer into the at least one isolator section over a line or area. Advantageously, in this way the shape and/or size of the metal layer in the interior of a carrier may be changed in order to adapt the metal layer in targeted fashion for a predefined function, e.g. as an electrode or resistance element. The light path of the laser radiation may be moved relative to the bonded plates using a movable deflection optic, or the bonded plates may be moved relative to a deflection optic of the laser radiation by a mechanical drive.

For example, one single conductor section and one single isolator section adjoining the conductor section, e.g. at the edge of the plates, may be formed. Alternatively, two or more conductor sections may be retained as unprocessed parts of the metal layer in the bond, between which respective isolator sections are provided. For example, the at least one isolator section may divide the metal layer into at least two separate metal layer sections. This variant of the invention is advantageous in particular for production of an electrostatic holding device which contains two large-area electrodes configured for loading with a high voltage. Furthermore, the at least one isolator section may form a predefined arrangement of electrodes with freely selectable geometry in the carrier. An electrode arrangement may comprise for example electrode areas and/or electrode strips, in particular straight or curved electrode strips. For example, an electrode arrangement may comprise two electrodes with comb-like intermeshing electrode strips. With loading with alternating electrical fields, such an electrode arrangement is advantageous as a contactless electric drive (linear drive).

According to the invention, the plates are provided with polished surfaces on the bonding face sides before bonding. Polishing comprises smoothing the plates with known polishing agents and methods (e.g. chemical mechanical polishing, CMP), so that the subsequent bonding is prepared. Furthermore, the bonding faces of both plates are each formed by metallic bond layers. Preferably, the plates, in particular the plate bodies or intermediate layers provided thereon, are polished during a preparation step and each provided with a metallic bond layer, e.g. by thin layer deposition. The metallic bond layers preferably extend over the entire bonding faces of the plates.

Furthermore, the bonding according to the invention comprises atomic diffusion bonding. Atomic diffusion bonding comprises joining the plates, which each carry a metallic bond layer, by the formation of an intermetallic connection between the bond layers. The intermetallic connection is formed along a bond front which automatically travels along the main plane on all sides over the mutually facing bonding faces. The intermetallic connection is supported by mutual diffusion of atoms from the bond layers into the respective other bond layer. Preferably, one single bond front is formed which travels over the bonding faces. The bond front is preferably formed spontaneously or initiated by a temporally and locally limited starting pressure. During bonding of the plates, an atomic diffusion bond (bond produced by atomic diffusion bonding) is formed, wherein the metallic bond layers form the metal layer between the bonded plates. The atomic diffusion bond extends on the mutually facing sides of the plates, preferably as an uninterrupted joint connection between the two joined plates. Atomic diffusion bonding takes place for example in an evacuated environment or at atmospheric pressure. Atomic diffusion bonding takes place at a temperature which lies below the softening temperature of the plate materials, preferably less than or equal to 300° C., particularly preferably less than or equal to 200° C.

Use of atomic diffusion bonding has the particular advantage that joining the plates is considerably simplified in comparison with the anodic bonding according to [3] or diffusion bonding according to [12]. The inventors have found that atomic diffusion bonding of the previously polished bonding faces provides a solid joint connection which is also sufficiently resistant to mechanical load during use of the component. By deviation from [3], atomic diffusion bonding is used instead of anodic bonding to join the plates, thus overcoming the limitation to few plate materials suitable for bonding. With of the invention, components may be constructed from the same or different plate materials, e.g. with different thermal expansion coefficients, which are optimised for the respective application and could not be created with conventional methods. A component produced according to the invention is for example an electrostatic holding device with structured, high-voltage-resistant electrodes in the form of a sandwich structure of glass—metal electrode—sapphire, or glass—metal electrode—diamond.

The inventors have furthermore found that atomic diffusion bonding also allows the local conversion of a metal layer described in [3] without adversely affecting the strength of the bond and without the two plates having to consist of the glasses provided for anodic bonding. This result is surprising since, with atomic diffusion bonding, a weaker joint connection was expected and it was assumed that glasses provided for anodic bonding would exert a substantial influence on the conversion of the metal layer. The inventors have also found that atomic diffusion bonding may overcome the disadvantages of diffusion bonding at extremely high temperatures and pressures as described in [12]. The process performance of atomic diffusion bonding at relatively low temperatures, e.g. room temperature, overcomes restrictions with respect to plate materials and the combinability of different plate materials.

In contrast to the situation described in [13], the bond layers in the component produced according to the invention fulfil a double function: firstly for bonding and secondly as functional layers, e.g. as electrodes or resistance heating elements, in the finished component. Advantageously, the invention provides a method for processing a metal layer which forms a bond layer and is therefore embedded in a sandwich structure in a multilayer component, and at the same time serves e.g. as an electrically conductive electrode or electrical conductor in the finished component. With the method, the bond layers necessary for the bond are converted into the at least one isolator section in a partial region.

After bonding and processing of the metal layer, the component produced according to the invention may be subjected to further post-processing steps. The post-processing steps may e.g. comprise heat treatment (tempering) and/or an adaptation of the component for its application, e.g. in an electrostatic holding device.

Heat treatment has the advantage that the mutual diffusion of atoms from the bond layers is improved, and hence the atomic diffusion bond strengthened. Heat treatment has proved particularly advantageous e.g. when tungsten is used to form the bond layers. Heat treatment preferably comprises setting the component temperature in a range from 100° C. to 300° C., e.g. 200° C.

The adaptation of the component for its application may comprise e.g. contacting the metal layer(s) e.g. at the edge of the plates or through subsequently produced holes in the plates, and/or a further surface coating of the component.

According to a preferred embodiment of the invention, the atomic diffusion bonding is carried out at room temperature (for example in a temperature range from 0° C. to 40° C., in particular around 15° C. to 24° C.). The temperature of the plates during joining is room temperature. An important advantage of the process performed at room temperature lies in the considerable simplification in comparison with conventional joining methods performed at high temperature. Furthermore, advantages result since the component produced according to the invention is typically used at room temperature, so that in comparison with the temperature for production of the component, no or negligible temperature changes occur. This allows the connection of plate materials with different thermal expansion coefficients without adversely affecting the shape-stability of the component during use.

According to a further preferred embodiment of the invention, the pressure between the bonding faces during bonding of the plates is e.g. less than 100,000 Pa. Because of this relatively low pressure, performance of the method is advantageously substantially simplified in comparison with conventional joining processes performed in the hot press. Possible undesirable influences of an increased pressure on the shape-stability of the final bonded component are avoided. Preferably, the atomic diffusion bonding takes place without the application of an external contact pressure on the plates, e.g. by a press.

Optionally, a low contact pressure may be provided which is only sufficient to prevent air inclusions in the atomic diffusion bond. If the contact pressure is provided, this is preferably locally limited to a centre section of the plates.

Alternatively or additionally, it may be provided to hold the plates initially spaced apart at their outer edges during atomic diffusion bonding. For example, external clamps may be provided as spacers. Advantageously, this helps the bond front run from the middle of the bonding faces towards the outside without inclusions.

For example, the atomic diffusion bonding takes place in the state in which the plates lie stacked one above the other at atmospheric pressure. The upper plate which lies on the lower plate exerts a weight force on the lower plate. Apart from a starting phase in which the bonding is initiated by a temporary and locally limited starting pressure (pressure pulse), in the stack arrangement during bonding, the external pressure between the bonding faces is preferably formed exclusively by the weight force of the upper plate. The starting pressure may for example be produced by a pulse-like manual pressure application, in particular in the middle of the top plate. After initiation of the bonding, during travel of a bond front from the middle of the plate along the bonding faces to the plate edge, no further pressure is applied.

According to a further preferred feature of the invention, the plates on the bonding face sides are polished to a roughness which is less than 1 nm rms, preferably less than 0.8 nm rms, e.g. less than 0.5 nm rms. The inventors have found that after prior polishing of the bonding faces, the mechanical resistance of the joint connection, in particular continuously over the entire plate face, is substantially improved if the roughness is set below said limits.

The at least one isolator section may be formed by oxidation of the metal of the metal layer by use of oxygen from the adjacent plate material. This mechanism for forming the at least one isolator section is not however absolutely necessary. Thus according to a preferred variant of the invention, the metal contained in the metal layer undergoes a change of the material microstructure under the effect of the laser radiation. The material microstructure is changed such that, in particular in comparison with a macroscopically uninterrupted metallic material, it breaks up so that the electrical conductivity is lost in the region changed by the laser radiation and thus at least one isolator section is formed. The connection of the metal layer, which is initially uninterrupted after bonding, along the interface between the bonding faces, is converted by the laser radiation into an electrically non-conductive structure. The formation of the at least one isolator section by production of the electrically isolating structure has the particular advantage of overcoming restrictions with respect to the selection of plate materials, and the bond layers may be formed from non-oxidising metals such as e.g. gold.

An essential advantage of the invention lies in the great variability in the selection of plate materials. Material restrictions, such as in the bonding processes used in the prior art, are overcome. The plates are preferably made of glass, in particular low-ion glass e.g. borosilicate glass, in particular glass with trade name Eagle XG (manufacturer Corning), glass ceramic, a crystalline material, in particular sapphire or diamond, ceramic, in particular silicon nitride, aluminium nitrite or aluminium oxide, and/or plastic.

The bond layers for atomic diffusion bonding may each comprise one single layer or a layer stack of two or more metallic materials. The bond layers comprise e.g. gold (see [14]), platinum, titanium, silver and/or tungsten (see [15], [16]). If the bond layers consist of metals which may react with the surrounding atmosphere, in particular e.g. titanium, silver and/or tungsten, the atomic diffusion bonding is preferably carried out under vacuum or under inert gas in order to avoid reactions of the metals with the environment.

According to a further advantageous embodiment of the invention, it may be provided that the two plates joined by atomic diffusion bonding are made of different materials. Advantageously, this allows the plates to have different properties, e.g. different electrical parameters, depending on the use of the component. For use as an electrostatic holding device, it is particularly preferred for one of the plates to be made of a material distinguished by a high-voltage disruptive strength of at least 1000 V/mm. The plate with the increased high-voltage disruptive strength may advantageously be provided as a dielectric on the (e.g. top) side of the holding device on which e.g. semiconductor wafers will be held. Alternatively, the mutually joined plates may comprise the same materials.

According to further variants of the inventions, the plates may have the same or different thicknesses. In particular, one of the plates may have a greater thickness than the other plate, and e.g. form the carrier plate, while the other plate accordingly has a lower thickness and e.g. may form the dielectric for setting dielectric properties of the holding device.

An essential feature of the invention is that the surfaces of the plates are polished before application of the bond layers and atomic diffusion bonding. The application of atomic diffusion bonding according to the invention is advantageously also possible for materials which can only be polished within limits, such as for example ceramic materials. Correspondingly, according to a further advantageous embodiment of the invention, it may be provided that at least one of the plates on the bonding face side has a smoothing layer on which the associated metallic bond layer is formed. The smoothing layer is formed from a material which has adequate adhesion to the respective plate and to the bond layer, and can be polished. Preferably, the smoothing layer consists of glass or metal with a thickness in the range from 100 nm to 100 μm.

According to a further advantageous modification of the invention, at least one of the plates on the bonding face side may have at least an adhesion-promoting layer on which the associated metallic bond layer is formed. The adhesion-promoting layer is also made of a material which has adequate adhesion to the adjacent plate and the bond layer, and may consist of the same material as the smoothing layer or alternatively e.g. of titanium or chromium. The adhesion-promoting layer may comprise one single layer or a layered stack of several layers. The thickness of the adhesion-promoting layer is preferably selected in the range from 5 nm to 100 nm.

According to further advantageous embodiments of the invention, the following features of the laser radiation provided for converting the metal layer into the at least one isolator section may be provided either individually or in combination. Preferably, the laser radiation has a wavelength at which at least one of the plates is transparent. Furthermore, preferably a laser radiation is used with a wavelength which is absorbed by the metal layer. Typically, the wavelength of the laser radiation is selected in the range between ultraviolet (UV) and infrared (IR) radiation, while the plate through which the laser radiation is directed onto the metal layer is transparent in the ultraviolet, visible and/or infrared spectral range. Furthermore, the laser radiation may be irradiated onto the metal layer focused or defocused. Furthermore, the laser radiation for locally heating the metal layer is preferably generated with a pulsed laser. The pulsed laser generates the laser radiation as a sequence of laser pulses with a pulse duration in the fs, ps or ns range.

Advantageously, there are various applications for the component produced with the method according to the invention. According to a first advantageous application, the component is a carrier of an electrostatic holding device which is composed of the bonded plates and contains at least one large-area electrode that is formed by the at least one conductor section and configured for loading with a high voltage, wherein the at least one isolator section is arranged adjacent to the at least one electrode. Particularly preferably, the electrostatic holding device contains at least two large-area electrodes which are configured for loading with a high voltage and separated from each other by the at least one isolator section along the atomic diffusion bond. Preferably, the processing of the metal layer provided according to the invention produces, in addition to the at least one electrode, also at least one conductor track which is connected to the at least one electrode. If several electrodes are provided, preferably each electrode is provided with a conductor track leading to a contact section. The electrodes are connected via the contact sections to a switchable high-voltage source device.

According to a second advantageous application, the component is a conductor component which is composed of the bonded plates and contains at least one conductor track which is formed by the at least one conductor section and is configured for loading with an electrical current, wherein at least one isolator section is arranged adjacent to the at least one conductor track. According to an advantageous variant, the conductor component may contain at least two conductor tracks which are each formed by a conductor section and separated from each other by the at least one isolator section. The component produced according to the invention may e.g. be a drive device for moving a workpiece under the effect of alternating electrical fields (travelling fields, linear drive). Particularly preferably, in this case too, the component is formed by two plates bonded by atomic diffusion bonding, wherein the metal layer provided for atomic diffusion bonding according to the invention is converted into an electrode arrangement of at least two electrodes with a plurality of electrode areas and/or electrode strips. Alternatively or additionally, at least one conductor track may be configured as a resistance heating element. The component produced according to the invention in this application preferably forms at least one electrical resistor, in particular at least one electrical heating resistor. With the method according to the invention, it is possible to set the size of the metal layer and hence its electrical surface resistance. In this case, the plates are preferably made of materials with the same or similar thermal expansion coefficients.

As an independent subject of the invention, a component is considered which comprises two plates, wherein both plates are electrically isolating and at least one of the plates is optically transparent, and wherein at least one planar conductor section and at least one isolator section are formed between the plates. The plates are connected together by means of an atomic diffusion bond. The atomic diffusion bond is characterized by a metal layer between the plates, the metal atoms of which form an intermetallic connection between the metal layers of the two plates. The at least one planar conductor section and the at least one isolator section are formed from the metal layer contained in the atomic diffusion bond. The at least one isolator section comprises an electrically isolating microstructure without metallic conductivity.

BRIEF DESCRIPTION OF THE DRAWINGS

Further advantages and details of the invention are described below with reference to the appended drawings. The drawings show.

DETAILED DESCRIPTION OF PREFERRED EMBODIMENTS OF THE INVENTION

Preferred features of embodiments of the method according to the invention and the component produced with the method are described below substantially with reference to the preparation of plates, the production of the component by atomic diffusion bonding, and the processing of the metal layer in the atomic diffusion bond. Details of the processing of the metal layer may be implemented as described in [3]. Accordingly, with respect to the features of the processing of the metal layer, [3] is introduced into the present disclosure by reference. Details of the complete structure and application of the component produced according to the invention, for example as an electrostatic holding device, are not described insofar as these are known from the prior art.

Figure 1:
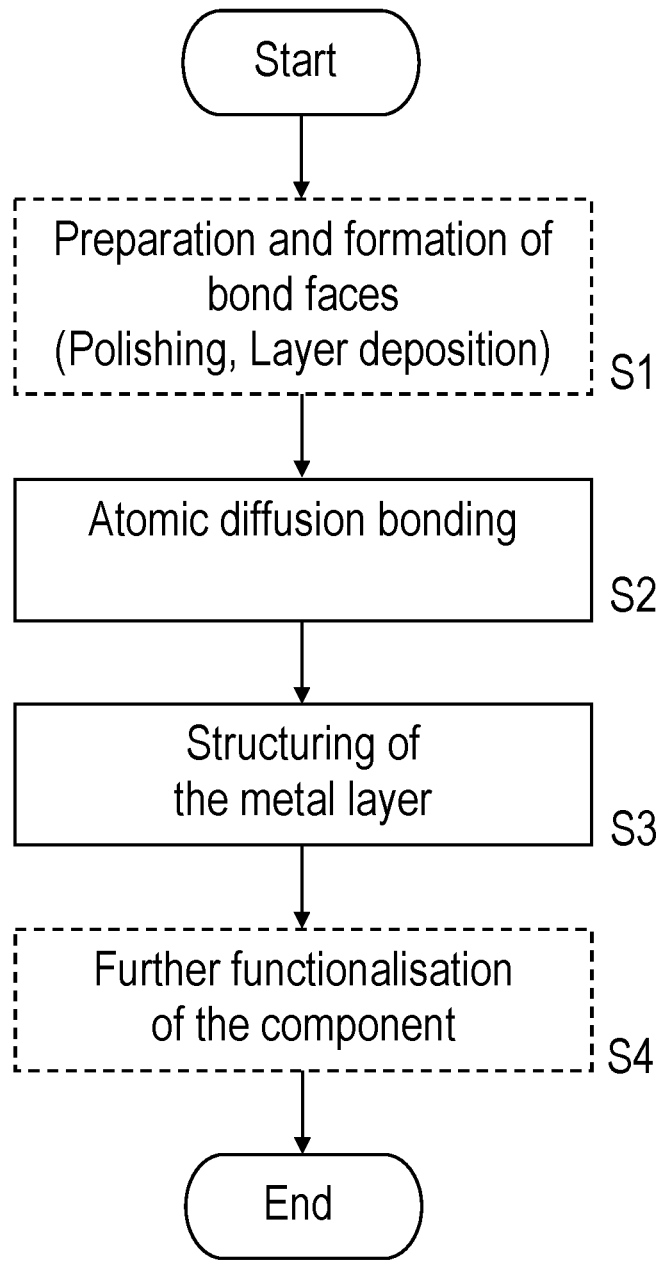
FIG. 1: a schematic illustration of a preferred embodiment of the method according to the invention for producing a component from two plates.

According to FIG. 1, before production of the component by atomic diffusion bonding, firstly a preparation step S1 takes place in which the plates are provided with the prepared bonding faces. In detail, the preparation step S1 comprises a setting of the flatness and roughness of the plate sides provided for the bonding faces, by polishing of the plate bodies and cleaning of the polished surfaces. Optionally, firstly smoothing layers may be applied to the surfaces of the plates intended for bonding, and the smoothing layers subjected to polishing. Before polishing, lapping of the surfaces may be provided. The roughness of the layer on the substrates is RMS<1 nm, preferably <0.8 nm, e.g. in the range from 0.5 nm to 0.8 nm, or even <0.5 nm. Subsequently, it follows a coating of the polished surfaces with the bond layers. The bond layers are for example respective single layers or layered stacks, e.g. a titanium layer (thickness e.g. 5 nm) and a gold layer (thickness e.g. 30 nm). The bond layers are formed for example by deposition from the vapour phase. Optionally, before deposition of the bond layers, an adhesion-promoting layer may be applied to the polished surfaces of the plates. Alternatively or additionally, before and/or after deposition of the bond layers, plasma treatment may be provided. Plasma treatment, e.g. with an argon plasma, is preferably provided if the bond layers are not made of gold.

Subsequently, in joining step S2, the atomic diffusion bonding of the prepared plates takes place. The coated sides of the plates form the respective bonding faces. The exposed surface of the bonding face of the one plate, for example made of gold, touches the exposed surface of the other plate, for example also made of gold. For atomic diffusion bonding, the plates are laid one upon the other as a stack, so that their shapes are mutually aligned. If atomic diffusion bonding is not initiated spontaneously by the mutual contact, then manually or using a suitable tool, a starting pressure may temporarily be applied locally onto the plates in order to start the atomic diffusion bonding. Starting from at least one position at which the joining of the plates begins, at least one bond front travels along the interface between the bonding faces until the two plates are joined together. As a result of the joining step S2, the plates are fixedly connected together, wherein the bond layers form a metal layer embedded between the plates.

Figure 2:
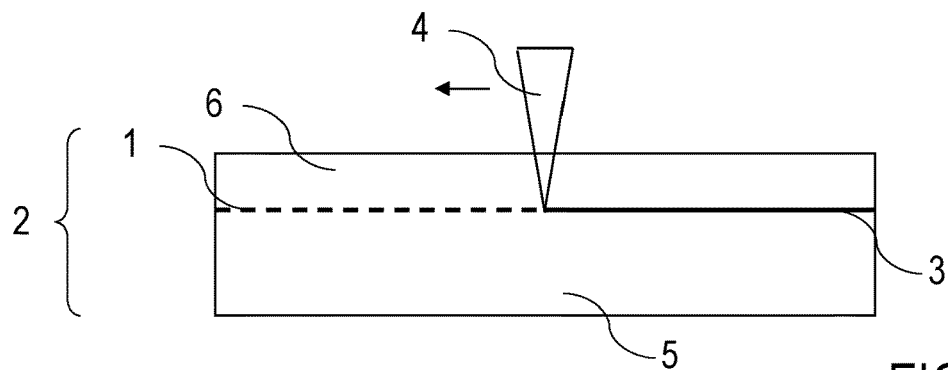
FIG. 2: a schematic illustration of the processing, provided according to the invention, of a metal layer embedded between two plates.

In the further method, according to FIG. 1, the structuring step S3 is provided in which the embedded metal layer is structured. The structuring of the metal layer is illustrated in the schematic sectional view of FIG. 2, showing the metal layer 1 which is embedded in a component 2 and is converted into an isolator section 3 under the effect of a focused laser radiation 4. The component 2 comprises two plates 5, 6, of which the lower plate 5 comprises an isolating material e.g. glass or sapphire, and has a thickness e.g. between 0.1 mm and 5 mm. The upper plate 6 consists e.g. of glass with preferably high dielectric constant, such as e.g. Eagle XG glass (manufacturer Corning) with a thickness of e.g. 0.1 mm. The metal layer 1 consists for example of gold with a thickness of 30 nm.

To convert the metal layer 1 into the isolator section 3, the laser radiation 4 is directed onto the metal layer 1. The laser radiation 4 may be focused onto the metal layer 1. Focused irradiation may have advantages with respect to the setting of a particularly high conversion temperature and the formation of the isolator section with a high spatial resolution. Alternatively, unfocused irradiation may be provided. If the intensity of the laser radiation 4 is sufficient to achieve the desired conversion temperature, in this case a larger isolator section may be formed than with focused irradiation. In order to form a strip-like isolator section 3 with a specific strip width, an irradiation field with a diameter equal to the desired irradiation width may be produced by defocusing. By moving the laser radiation 4 relative to the carrier 2, the metal layer 1 is converted into the isolator section 3 along the desired strip course. If the intensity of the laser radiation 4 is not sufficient to set a sufficiently high conversion temperature in the irradiation field on the metal layer 1, the desired area of the metal layer 1 may be converted into the isolator section 3 by multiple irradiations.

The power of the laser radiation and optionally a defocusing on the metal layer 1 are selected such that a desired conversion temperature is reached in the metal layer 1. The conversion temperature depends on the metal in the metal layer 1 and the thickness of the metal layer 1, and lies e.g. in the range from 1000° C. to 15,000° C. It is not absolutely necessary to know the conversion temperature. Rather, for implementation of the invention, it is sufficient to set the laser radiation 4 (intensity and/or beam diameter on the metal layer 1) such that the desired conversion of the metal layer 1 takes place. This setting may be achieved by the person skilled in the art by simple tests or by estimating the temperature of a metal layer which absorbs the laser radiation on a surface of a carrier.

In the further method according to FIG. 1, the functionalisation step S4 takes place in which the component is completed depending on its actual function. For example, to produce an electrostatic holding device, the electrodes may be contacted, further layers deposited and/or further plates connected.

Preferably, the preparation step S1 and/or the functionalisation step S4 are part steps of the method according to the invention. In this case, the joining of the plates and the processing of the metal layer take place immediately after preparation of the plates, and/or completion of the component takes places immediately after structuring of the metal layer. Steps S1 and S4 are not however necessarily part of the method according to the invention. For example, the preparation step S1 may be performed independently of the further steps of the method according to the invention, i.e. the method according to the invention is carried out with separately provided, ready prepared plates. Furthermore, the functionalisation step S4 may be carried out independently of the preceding steps of the method according to the invention, which in this case provides the joined and structured component as a semifinished product for further processing.

The method according to the invention was carried out as a test using the following example. As plates, two polished circular quartz glass wafers were used with a diameter of 76.2 mm and a thickness of 0.5 mm±0.2 mm (type POT 721, 10218000, DSP TTV<10 μm, Ra<0.5 nm by manufacturer Nano Quarz Wafer GmbH). The quartz glass wafers were firstly coated on one side with 5 nm Ti and then 30 nm Au in an ion beam vaporisation plant. The roughness of the bonding faces was determined with an atomic force microscope (1×1 μm measurement field) as approximately rms=0.5 nm. The quartz glass wafers were taken from the coating plant immediately after coating and bonded together along the bonding faces at room temperature by atomic diffusion bonding.

For bonding, the quartz glass wafers were placed one on the other at the bonding faces, i.e. on the gold surfaces, and an initial starting pressure was applied. A bond front propagated in the same way as in optical contact bonding processes. In contrast to joining by optical contact bonding, in the example described the bond provided a high mechanical resistance. Even with repeated energy-rich treatment in the ultrasound bath (frequency 40 kHz, tenside bath), the connection between the quartz glass wafers could not be separated. Also, using a razor blade applied at the side of the joint connection, the joint partners could no longer be completely separated. This result corresponds to experiments with atomic diffusion bonding in which compression shear strengths of up to 70 MPa were found (see [14]).

Between the quartz glass wafers, the bond layers formed a metal layer which was then structured by means of laser radiation. Laser radiation took place with a diode-pumped Nd:YAG-ns pulse laser (e.g. 355 nm wavelength, 50 mW, 7 μm spot width and >95% overlap from the irradiation site to irradiation site, scanning of metal layer along straight lines). An isolator section in the form of a strip with a width of 0.7 mm was produced. The isolator section was formed by several lines with 50% overlap on which the laser irradiation took place. An essential advantage of the invention was that the processing of the metal layer had no negative effect on the bond and only the isolator section was produced. The isolator section had a high-voltage disruptive strength up to a voltage above 30 kV. The mechanical strength of the bond was retained even after processing of the metal layer.

Figure 3:
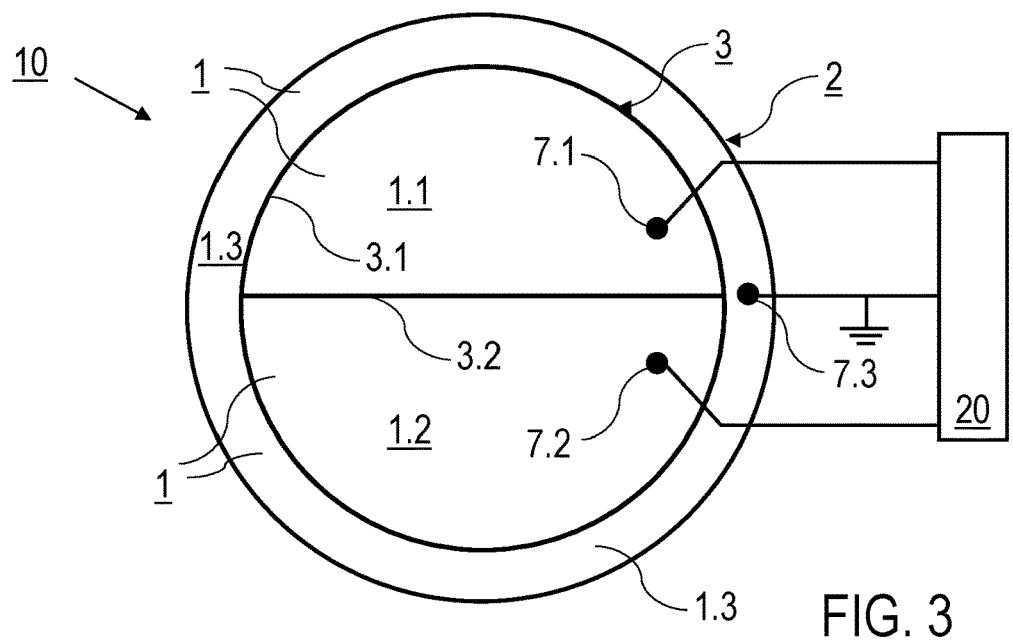
FIG. 3: a schematic top view of an electrostatic holding device produced with the method according to the invention.

FIG. 3 schematically illustrates a top view of an example of a component produced with the method according to the invention in the form of an electrostatic holding device 10. The electrostatic holding device 10 comprises two plates which are connected together by atomic diffusion bonding. A metal layer 1 is embedded between the plates and structured as shown in FIG. 2. With the method according to the invention, an isolator section 3 is formed in the metal layer 1 in the form of a circular ring 3.1 with a strip 3.2 running transversely in the circular ring 3.1. This divides the metal layer 1 into two electrodes 1.1, 1.2 each in the form of a semicircular area, and a ring electrode 1.3. The diameter of the plates is e.g. 30 cm. The width of the isolator section 3 along the circular ring 3.1 and along the strip 3.2 is e.g. 150 μm. The width of the ring electrode 1.3 is for example 10 mm.

The electrodes 1.1, 1.2 and 1.3 are completely covered by the top plate (e.g. plate 6 in FIG. 2) so that they are electrically isolated from the environment. Furthermore, the electrodes 1.1, 1.2 and 1.3 are isolated relative to each other by the isolator section 3. For contacting the electrodes 1.1, 1.2 and 1.3, contact holes 7.1, 7.2 and 7.3 are formed in the top plate, through which the electrodes 1.1, 1.2 and 1.3 can be electrically connected to a power supply device 20. The contact holes 7.1, 7.2 and 7.3, which e.g. have a diameter of 500 μm, are formed for example by etching the top glass element with hydrofluoric acid (HF). The contact holes 7.1, 7.2 and 7.3 are etched using a film mask. The metal layer 1 serves as an etching stop during etching. As an alternative to etching, the contact holes 7.1, 7.2 and 7.3 are produced in the top plate mechanically by drilling or grinding.

The power supply device 20 comprises a high-voltage source which is configured to load the electrodes 1.1 and 1.2 with a positive or negative high voltage respectively, and connect the ring electrode 1.3 to ground potential.

The electrostatic holding device 10 furthermore comprises, for use for transport of workpieces e.g. semiconductor wafers, a holding device and/or a drive device which are formed as such, as in conventional electrostatic holding devices, and not shown in FIG. 3.

Figure 4:
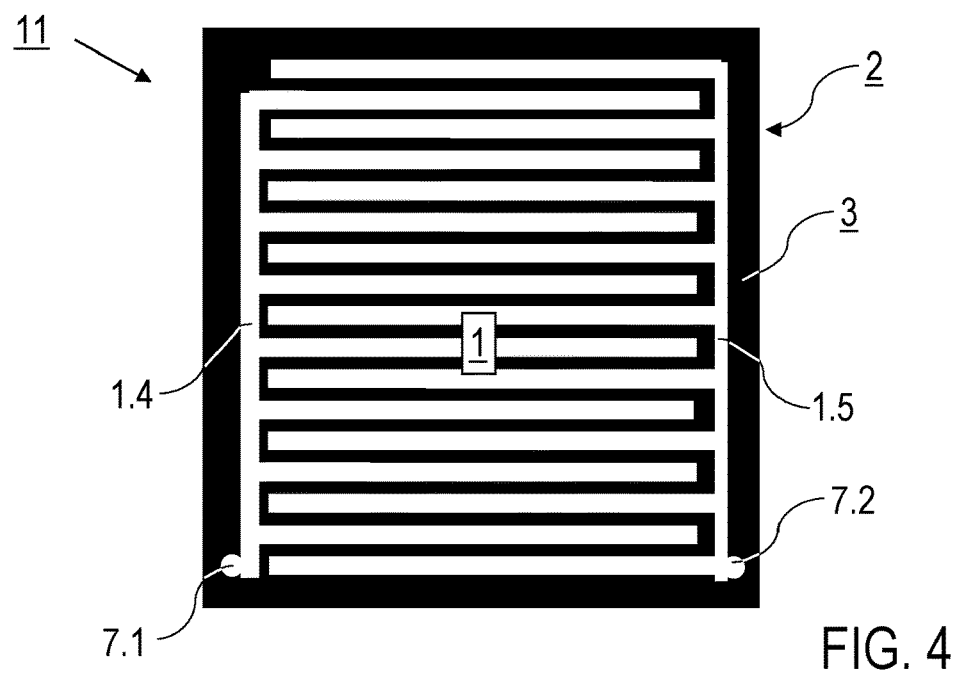
FIG. 4: a schematic top view of an electrode arrangement for a contactless drive produced with the method according to the invention.

FIG. 4 illustrates in schematic top view a travelling wave drive device 11 as a further example of a component produced with the method according to the invention. The travelling wave drive device 11 is configured for moving a workpiece under the effect of travelling electrical fields. In this example, two plates are also produced by atomic diffusion bonding via intermediate bond layers. The bond layers form the metal layer 1 which, for the embodiment in FIG. 4, is structured as an electrode arrangement with two comb-like electrodes 1.4, 1.5. With the method according to the invention, an isolator section 3 is formed which is composed of a meandering strip 3.3 and a rectangular strip frame 3.4. Each of the electrodes 1.4, 1.5 is contacted via a contact hole 7.1, 7.2 in the top plate and connected to a power supply (not shown). The comb-like electrodes 1.4, 1.5 are formed with intermeshing strip-like electrode fingers and may be loaded with alternating electrical voltages each of opposite polarity. As a result, with the electrodes 1.4, 1.5, travelling electrical fields can be generated adjacent to the travelling wave drive device 11, under the effect of which a workpiece e.g. a semiconductor wafer can be moved on a gas bed.

The implementation of the invention is not restricted to the illustrated layout of the electrode arrangement but may be varied depending on the actual application of the invention, e.g. depending on the desired orientation of the field effect.

Figure 5:
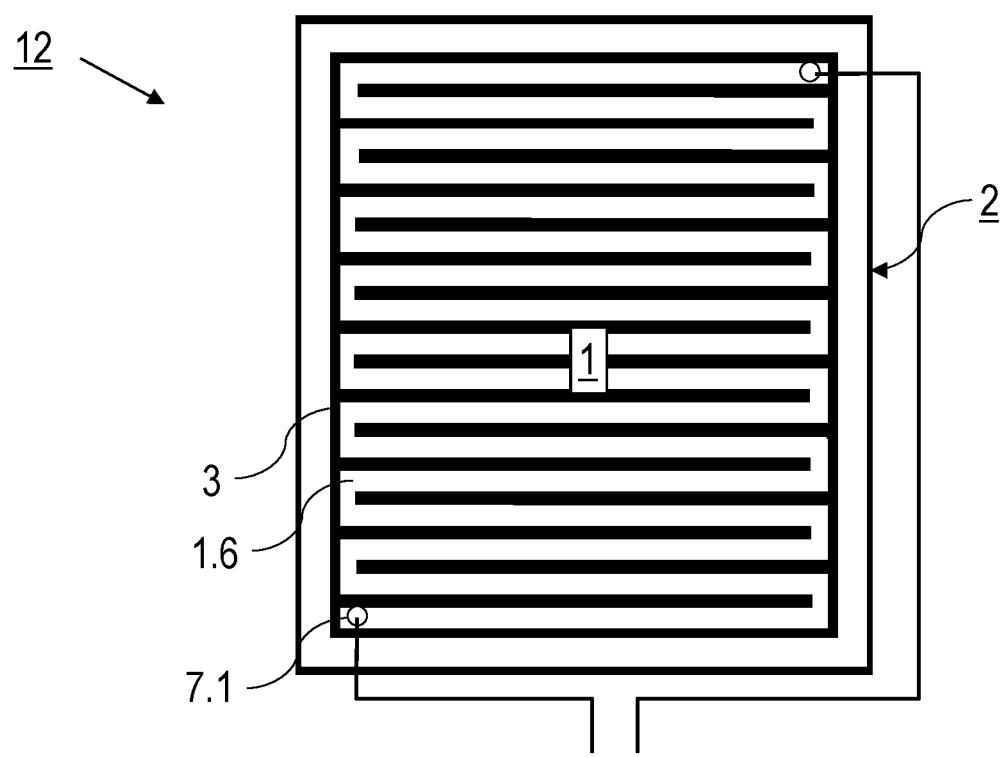
FIG. 5: a schematic top view of an electrical heating resistor produced with the method according to the invention.

FIG. 5 illustrates a further example of a component produced according to the invention which forms an electrical heating resistor 12. The metal layer 1 embedded between plates is structured to form a predefined electrical resistance for resistance heating. The heating resistor 12 comprises two plates which are connected by atomic diffusion bonding, wherein the bond layers provide the metal layer 1. With the method according to the invention, the isolator section 3 is shaped so as to form a meandering electrode 1.6. The width of the isolator section 3 may set the surface resistance of the electrode 1.6 and hence e.g. a heating power of a heating resistor.

The features of the invention disclosed in the above description, the drawings and the claims may be relevant, both individually and in combination, for the implementation of the invention in its various embodiments.

What is claimed is:

1. A method for producing a component from two plates, wherein both plates are electrically isolating, at least one of the plates is optically transparent, and between the plates at least one planar conductor section and at least one isolator section are formed, said method comprising the steps:

bonding the plates at mutually facing bonding faces, wherein a metal layer is arranged between the plates, and processing the metal layer by local heating of the metal layer by use of laser radiation such that the metal layer is converted into the at least one isolator section in a partial region, and the at least one planar conductor section is formed adjacent to the at least one isolator section, wherein to form the at least one isolator section, a light path of the laser radiation and the component are moved relative to each other in order to convert the metal layer into the at least one isolator section over a line or area, wherein the plates are polished on sides of the bonding faces and the bonding faces are formed by metallic bond layers, and the bonding of the plates comprises atomic diffusion bonding, wherein the metallic bond layers form the metal layer between the bonded plates.

2. The method according to claim 1, wherein the atomic diffusion bonding is carried out at room temperature.

3. The method according to claim 1, wherein the plates on the bonding face sides are polished to a roughness which is less than 1 nm rms.

4. The method according to claim 1, wherein during processing of the metal layer by local heating of the metal layer, a metal contained in the metal layer undergoes a change in a material microstructure under an effect of the laser radiation so as to form the at least one isolator section.

5. The method according to claim 1, wherein the plates are made of different materials.

6. The method according to claim 1, wherein one of the plates is made of a material having a high-voltage disruptive strength of at least 1000 V/mm.

7. The method according to claim 1, wherein the plates comprise at least one of material selected from the group consisting of glass, glass ceramic, crystalline material, sapphire, diamond, ceramic and plastic.

8. The method according to claim 1, wherein at least one of the plates on the bonding face side has a smoothing layer on which the associated metallic bond layer is formed.

9. The method according to claim 1, wherein at least one of the plates on the bonding face side has at least one adhesion-promoting layer on which the associated metallic bond layer is formed.

10. The method according to claim 1, with at least one of the features the metal layer is heated locally by the laser radiation with a wavelength at which the at least one of the plates is transparent, the metal layer is heated locally by focused or defocused laser radiation, and the laser radiation for locally heating the metal layer is generated with a pulsed laser.

11. The method according to claim 1, wherein the component is a carrier of an electrostatic holding device which comprises the bonded plates and contains at least one large-area electrode that is formed by the at least one conductor section and configured for loading with a high voltage, wherein the at least one isolator section is arranged adjacent to the at least one large-area electrode.

12. The method according to claim 11, comprising at least one of the features

- the electrostatic holding device contains at least two electrodes which are each formed by a conductor section and are separated from each other by the at least one isolator section, and
- the processing of the metal layer by use of laser radiation comprises production of at least one conductor track which is connected to the at least one electrode.

13. The method according to claim 1, wherein
the component is a conductor component which is composed of the bonded plates and contains at least one conductor track that is formed by the at least one conductor section and configured for loading with an electrical current, wherein the at least one isolator section is arranged adjacent to the at least one conductor track.

14. The method according to claim 13, with at least one of the features

- the conductor component contains at least two conductor tracks which are each formed by a conductor section and are separated from each other by the at least one isolator section, and
- the at least one conductor track is configured as a drive device for moving a workpiece under an effect of alternating electrical fields or as a heating resistor.

* * * * *